United States Patent [19]

Hoshi et al.

[11] Patent Number: 5,466,524
[45] Date of Patent: Nov. 14, 1995

[54] BARIUM HEXAFERRITE-SILICON NITRIDE-CARBON MAGNETIC RECORDING MEDIUM

[75] Inventors: Youichi Hoshi, Kanagawa, Japan; Dennis E. Speliotis, Lexington, Mass.; Jack H. Judy, Roseville, Minn.

[73] Assignee: Kabushiki Kaisha Kobe Seiko Sho, Kobe, Japan

[21] Appl. No.: 203,760

[22] Filed: Mar. 1, 1994

Related U.S. Application Data

[63] Continuation of Ser. No. 879,422, May 7, 1992, abandoned.

[51] Int. Cl.$^6$ ................................................. G11B 5/66
[52] U.S. Cl. ............................. 428/336; 428/694 TS; 428/694 ST; 428/694 SL; 428/704; 428/900
[58] Field of Search ................... 428/694 ST, 694 SL, 428/694 SG, 694 TS, 694 T, 704, 900, 336; 369/13, 4

[56] References Cited

U.S. PATENT DOCUMENTS

| | | | |
|---|---|---|---|
| 4,411,963 | 10/1983 | Aine | 428/694 |
| 4,654,276 | 3/1987 | Ahlert et al. | 428/694 |
| 4,716,078 | 12/1987 | Kishine et al. | 428/694 |
| 4,789,598 | 12/1988 | Howard et al. | 428/694 |
| 4,957,604 | 9/1990 | Steininger | 204/192.2 |
| 5,045,298 | 9/1991 | Muramatsu et al. | 428/694 |
| 5,063,120 | 11/1991 | Edmonson et al. | 428/694 |
| 5,066,552 | 11/1991 | Howard et al. | 428/694 |
| 5,078,846 | 1/1992 | Miller et al. | 428/694 |
| 5,084,152 | 1/1992 | Lin | 428/694 |
| 5,326,607 | 7/1994 | Muramalsu | 428/65 |

FOREIGN PATENT DOCUMENTS

| | | |
|---|---|---|
| 258353 | 11/1986 | Japan . |
| 42023 | 2/1989 | Japan . |

OTHER PUBLICATIONS

*Magnetic Recording*, (1987), 1, pp. 148–149, "3.2.2.6 Barium Ferrite".
*Magnetic Recording*, (1987), 1, pp. 198–203, "3.3.2.2 Substrate And Undercoat Preparation".
*Magnetic Recording*, (1987), 1, pp. 216–222, "Perpendicular Anisotropy Films".
*Microchip Fabrication*, (1984), pp. 204–208, Semiconductor Services, San Jose, Calif.
*IEEE Transactions Oon Magnetics*, (1986), MAG–22, pp. 1146–1148, "BA–Ferrite Thin Film Rigid Disk For High Density Perpendicular Magnetic Recording", A. Morisako et al.
*J. Appl. Phys.*, (1985), 57, pp. 4040–4042, "BA–Ferrite Thin–Film Disk For Perpendicular Magnetic Recording", M. Matsuoka et al.

*Primary Examiner*—Paul J. Thibodeau
*Assistant Examiner*—R. Follett
*Attorney, Agent, or Firm*—Oblon, Spivak, McClelland, Maier & Neustadt

[57] ABSTRACT

A magnetic recording medium suitable for high density recording is prepared by depositing a silicon nitride interlayer onto a carbon substrate and then sputter depositing a barium hexaferrite magnetic recording layer onto the silicon nitride interlayer.

6 Claims, No Drawings

BARIUM HEXAFERRITE-SILICON NITRIDE-CARBON MAGNETIC RECORDING MEDIUM

This application is a Continuation of application Ser. No. 07/879,422, filed on May 7, 1992, now abandoned.

BACKGROUND OF THE INVENTION

1. Field of the Invention

The present invention is directed to magnetic recording media and, more specifically, to barium hexaferrite films deposited on a carbon substrate having a silicon nitride intermediate layer (interlayer).

2. Discussion of the Background

Magnetic recording media such as magnetic disks are now widely used for audio, video and computer applications. In a magnetic recording system, recording and reproducing are conducted by means of a magnetic head. A pattern of remanent magnetization is formed along the length of a track or a number of parallel tracks on a magnetic recording media by means of the recording head. The recorded magnetization creates a pattern of magnetic fields which are used to read the data stored in the magnetic recording medium. When the recorded magnetic medium is passed by the same or a similar recording head, the pattern of magnetization can be read by the recording head and the recorded data reconstructed by appropriate electrical processing.

Recent efforts in the field of magnetic recording media have centered on the development of higher areal densities by increasing both the linear recording density as well as the track densities on the magnetic recording medium. Substantial increases in both linear and track densities require improvements in both magnetic recording materials and recording techniques and components.

Magnetic recording requires an interaction between the surface of the magnetic recording medium and the recording head. High density recording requires that the distance between the magnetic recording medium and the recording head be as small as possible. With decreasing distances between the recording head and the surface of the recording medium, however, problems associated with the material properties of the magnetic head and the magnetic recording material arise. The surface of the magnetic recording medium must be finished to a mirror smooth surface to allow the recording head to approach the surface as closely as possible. At these close spacing distances, problems associated with friction and subsequent wear of a magnetic recording layer may result in deterioration of the recording head and medium. The surface smoothness and adhesion of magnetic recording layers to substrates on which they are deposited is, therefore, particularly important with high density recording media.

The standard substrate material for hard disk recording media is high-purity aluminum-magnesium alloy, coated with a nickel-phosphorus (Ni—P) alloy. Glass substrates have also been used but suffer from problems associated with brittleness and fracture during assembly and operation (*Magnetic Recording*, C. D. Mee and E. D. Daniel, Vol. I, p. 100, 198–203, McGraw-Hill, Inc., 1987). More recently, carbon substrates have been proposed (U.S. Pat. Nos. 5,045, 298; 4,716,078).

Magnetic disks having high density memory capacity have been prepared by depositing a magnetic oxide or metallic magnetic films onto the substrate surface. The media film is conventionally deposited by means of a sputtering process (U.S. Pat. No. 4,411,963). Conventional sputtering processes include diode, triode and magnetron sputtering processes (*Microchip Fabrication*, P. Van Zant, pp 204–208, Semiconductor Services, San Jose, Calif. 1984).

Magnetic recording materials may be utilized for both longitudinal (horizontal) and perpendicular (vertical) recording. Magnetic thin film thicknesses of 500–5,000 Å are particularly preferred for perpendicular magnetic recording applications. Magnetic thin films having a thickness of about 200–800 Å are particularly preferred for longitudinal recording applications. Many metal alloy thin films have been proposed for these applications. See, for example, U.S. Pat. Nos. 5,063,120; 5,084,152 and 4,654,276. Metal alloy films containing oxygen are also known (U.S. Pat. No. 5,066,552). These films may be deposited by conventional sputtering processes.

The small head-medium distances critical to reaching higher densities on hard disks give rise to disk wear as noted above. Overcoat layers are known to provide a wear-resistant layer and minimize disk wear. Overcoat layers prepared from rhodium, carbon, TiC, TiN, SiC, $Cr_2C_3$ and $Al_2O_3$ have been suggested (*Magnetic Recording*. pp. 219–222; U.S. Pat. No. 4,789,598). A protective overcoat layer of hafnia and zirconia has also been proposed (U.S. Pat. No. 5,078, 846).

Barium ferrite thin films have been investigated as possible magnetic recording layers for disk recording media. The reasons for this are the excellent hardness and resistance to environmental degradation of the ceramic material, and its high magnetocrystalline anisotropy and square hysteresis loop leading to high recording density. For example, oriented barium ferrite thin films can be formed by epitaxial growth on $SiO_2$/Si wafer disks on which a c-axis-oriented ZnO film has been deposited (M. Matsuoka, M. Naoe, Y. Hoshi, J. Appl. Phys., 57(1):4040–4042, 1985). Oriented barium ferrite thin films are obtained using a facing target-type sputtering system and a substrate temperature of 500° C. Barium ferrite films have also been produced on oxidized silicon wafers using a conventional rf diode sputtering system (A. Morisako, M. Matsumoto, N. Naoe, *IEEE Transactions on Magnetics*, Vol. MAG- 22(5):1146–1148, 1986). Crystalline barium ferrite films generally require high substrate temperatures (400°–650° C.) during sputtering (*Magnetic Recording*, pp. 217).

As indicated above, the sputtering conditions described require a substrate material which is capable of withstanding temperatures of 500° C. in moderate vacuum conditions without degradation of its mechanical properties (smoothness and dimensional tolerance). Present substrate materials, such as aluminum and glass, are not capable of this. For barium ferrite media sputtering, a substrate such as carbon or alumina is necessary. The material used in the experiments described by Hoshi, oxidized silicon, is too delicate to survive in actual disk drive service.

A need exists, therefore, for improved magnetic recording media, in particular disk magnetic recording media, useful for high density magnetic recording.

SUMMARY OF THE INVENTION

Accordingly, one object of the present invention is to provide magnetic recording media having good magnetic and physical properties suitable for high density magnetic recording.

A further object of the present invention is to provide a process for producing these recording media.

These and other objects which will become apparent from the following specification have been achieved by the present recording media comprising a substrate, an interlayer and a magnetic recording layer. Preferably, the substrate is a carbon substrate upon which has been deposited a silicon nitride interlayer. A barium hexaferrite magnetic recording layer is then deposited over the silicon nitride interlayer to provide a most preferred magnetic recording medium.

DETAILED DESCRIPTION OF THE PREFERRED EMBODIMENTS

The recording medium of the present invention is a multilayer structure containing a magnetic recording oxide layer, an interlayer and a base or substrate layer.

In one aspect of the present invention, a silicon nitride layer is deposited on a carbon substrate to provide a support for the further deposition of a magnetic layer. A magnetic recording material may then be deposited over the silicon nitride interlayer to form a magnetic recording medium. The silicon nitride interlayer adheres tightly to the carbon substrate, also preventing diffusion of carbon atoms into the magnetic recording layer and preventing oxidation of the carbon substrate during deposition of an oxide magnetic recording layer. The silicon nitride also functions to provide a smooth surface onto which the magnetic recording layer is deposited.

In a second aspect of the present invention, a barium hexaferrite magnetic recording layer is deposited onto a silicon nitride surface to form a magnetic recording medium. In this embodiment, silicon nitride provides a smooth surface upon which to deposit the barium hexaferrite recording layer. The silicon nitride surface may be present on a substrate material. Barium hexaferrite adheres tightly to the silicon nitride interlayer to provide a stable magnetic recording medium.

In a third aspect of the present invention, a silicon nitride layer is deposited onto a carbon substrate to form a support. A barium hexaferrite magnetic recording layer is then deposited over the silicon nitride layer. The silicon nitride and barium hexaferrite films adhere tightly to the carbon substrate providing a magnetic recording medium having high saturation magnetization and coercive force (Oe).

Suitable rigid substrate materials for use in preparing the magnetic recording media of the present invention include all high temperature capability materials which can be used as a hard disk support. Hard disk support substrates should be shock resistant, i.e., able to withstand dropping onto hard surfaces, able to withstand the high centrifugal forces (high rpm) required for spinning hard disk applications and must have very flat and smooth surfaces. Examples of suitable substrates include ceramic and carbon substrates. Preferred substrates are amorphous carbon substrates which are lightweight, strong and capable of withstanding the high deposition temperatures (400°–650° C.) required for deposition of barium hexaferrite by conventional sputtering processes. Suitable amorphous carbon substrates include, for example, amorphous carbon substrates prepared by carbonizing or pyrolyzing molded thermosetting resins, optionally containing carbon fillers such as graphite, carbon black, etc. Such carbon substrates may be formed by cast molding, compression molding, injection molding or any other known molding method.

To reduce surface abrasion, it is preferable that the amorphous carbon substrate have apparent density of 1.75 or more. These particularly preferred amorphous carbon substrates can be prepared by molding a thermosetting resin followed by a preliminary heating or sintering to eliminate gaseous components at a temperature of about 1,000°–1,900° C. Following this preliminary sintering process, pores are eliminated by hot isostatic pressing (HIP) at pressures not less than about 1,000 atm at a temperature of not less than 2,050° C. Preferred HIP treatments are conducted at 2,050°–2,600° C. and a pressure of at least 1,000 atm. If desired, strength of the amorphous carbon substrate material can be enhanced by injecting ions into the surface of the material thereby intercalating graphite into the surface of the amorphous carbon material after the HIP treatment. Preferred carbon substrates are described in U.S. Pat. Nos. 4,716,078 and 5,045,298. These U.S. patents are incorporated herein by reference in their entirety to provide a more complete description of the preferred carbon substrates suitable for use in the present invention and methods of preparing the same.

In the magnetic recording material of the present invention, a silicon nitride (SiN) interlayer is deposited onto the substrate. Silicon nitride may be deposited by any known method for depositing silicon nitride films such chemical vapor deposition (CVD), plasma enhanced CVD (PECVD) or sputtering, for example. Preferably, the silicon nitride is deposited by a sputtering process. The silicon nitride interlayer is a continuous thin film of amorphous silicon nitride deposited onto the surface of the substrate material. The silicon nitride interlayer forms a smooth adherent coating on the substrate and, therefore, provides an excellent surface for depositing the magnetic recording layer.

When carbon substrates are used, the silicon nitride forms a barrier layer which prevents diffusion of carbon atoms into the magnetic recording layer and prevents oxidation of the carbon substrate during sputtering. Carbon atoms which have diffused from a carbon substrate into the magnetic recording layer interfere with the physical and magnetic properties of the recording layer. Diffusion of carbon atoms from the substrate causes an increase in the surface roughness of the substrate resulting in formation of magnetic recording films having a rough surface and poor adhesion to the substrate. Diffusion of carbon atoms may also interfere with formation of a continuous magnetic recording layer or, alternatively, disrupt crystal formation in the magnetic recording layer. The silicon nitride barrier layer, therefore, should have a thickness sufficient to prevent diffusion of carbon atoms from the substrate into the magnetic recording layer under the deposition conditions required for the magnetic recording layer. Preferably, the silicon nitride interlayer has a thickness of about 200–5,000 Å, preferably about 500–2,000 Å, more preferably about 500–1,500 Å. Means for controlling the thickness of a silicon nitride layer are well known in the art.

The silicon nitride may be deposited using any conventional sputtering process including diode, both direct current (dc) and radio frequency (rf), triode and magnetron sputtering processes. Conventionally, silicon nitride is sputtered using a sputtering gas containing an inert gas, such as argon containing nitrogen ($N_2$) gas (*Thin Film Processes*, ed. John L. Vossen and Werner Kern, Academic Press, San Diego, 1978, article by J. L. Vossen and J. J. Cuomo). Rf diode sputtering of the silicon nitride film, for example, can be accomplished using a sputtering gas containing argon and 5–20% nitrogen, preferably about 10% nitrogen, gas pressures ranging from about 5–20 mTorr, preferably about 5–15 mTorr and an input power ranging from about 0.5 to about 3 kW in a conventional rf diode sputtering apparatus. The resulting silicon nitride film has a smooth surface which is stable at substrate temperatures ranging up to about 650°–675° C.

The barium hexaferrite magnetic recording film is deposited as a continuous film onto the silicon nitride barrier layer. Barium hexaferrite ($BaO.6Fe_2O_3$) has a hexagonal crystal structure and is deposited onto the silicon nitride interlayer as randomly oriented hexagonal crystals. Barium hexaferrite films having a thickness up to about 500 Å form an amorphous thin film. Films having a thickness of about 500–5,000 Å form thin films having the characteristic hexagonal crystal structure. A preferred thickness is about 500–5,000 Å, more preferably about 500–3,000 Å, most preferably about 1,000–2,000 Å.

The barium hexaferrite thin film may be prepared by sputtering barium hexaferrite onto the silicon nitride/substrate using a dc facing target sputtering apparatus. Because barium hexaferrite is an oxide, the sputtering gas contains an inert gas, such as argon, mixed with oxygen gas. Generally, the inert gas contains about 2–25%, preferably about 5–10% oxygen gas. This corresponds to an oxygen partial pressure of about 0.002–5.0 mTorr. Overall sputtering gas pressures ranging from about 0.1 to about 20 mTorr, preferably about 0.3 to about 1.0 mTorr and a discharge current (Id) ranging from about 0.10 to about 1.0, preferably about 0.2 to about 0.5 amperes (A), produce adequate deposition rates and continuous thin films for 6 cm diameter targets.

During barium hexaferrite deposition, the substrate temperature is particularly critical. Below about 500° C., the barium hexaferrite thin films have an amorphous structure with no peaks from barium hexaferrite hexagonal crystals being detected by X-ray diffraction. Above about 650° C., hexagonal barium hexaferrite, mixed with the spinel crystalline structure, films are generally obtained and the silicon nitride interlayer becomes unstable. To obtain a crystalline barium hexaferrite film, it is necessary to maintain the silicon nitride/substrate temperature during sputtering of the barium hexaferrite film at a temperature between 500° C. and 650° C., preferably between 500 °and 600° C., more preferably between 525 °and 575° C. to ensure initial formation of crystalline hexagonal barium hexaferrite thin films.

Sintered barium ferrite disks are known and may be used as sputtering targets for deposition of the barium hexaferrite thin films of the present invention (A. Morisako, M. Matsumoto, N. Naoe, *IEEE Transactions on Magnetics*, Vol. MAG- 22(5):1146–1148, 1986). The size of the sputtering target is not particularly critical.

The deposited barium hexaferrite magnetic recording layer is quite hard and, therefore, it may not be necessary to apply a protective overcoat layer onto the barium hexaferrite layer. However, a protective overcoat layer may be applied if desired. Suitable overcoat layers are well known in the art and include, for example, carbon films deposited by low-energy sputtering, $SiO_2$, TiC, TiN, SiC, $Cr_2C_3$, $Al_2O_3$, etc. These protective layers may be deposited using known deposition processes.

If desired, a lubricant may be applied to the surface of the barium hexaferrite layer or the protective overcoat layer. Such lubricants are well known in the art and disclosed, for example, in *Tribology and Mechanics of Magnetic Storage Devices*, B. Bhushan, Springer-Verlag, New York, N.Y. (1990).

The magnetic recording media of the present invention have magnetic properties suitable for high density magnetic recording. Hexagonal barium ferrite films deposited at temperatures of about 500°–650° C. have a coercive force parallel to the substrate ($Hc_{parallel}$) of about 100–3000 Oe and a coercive force perpendicular to the substrate ($Hc_{perpendicular}$) of about 500–3000 Oe.

Other features of the invention will become apparent in the course of the following descriptions of exemplary embodiments which are given for illustration of the invention and are not intended to be limiting thereof.

EXAMPLES

Example 1

Interlayer materials were evaluated by depositing metal films (Pt, Cr), oxide films (barium ferrite, $SiO_2$, $Al_2O_3$, ZnO and silicon nitride (SiN) onto an amorphous carbon substrate. For the metals Pt and Cr, argon was used as the sputtering gas. A sputtering gas of argon containing 10% oxygen was used for deposition of the oxide interlayers and a sputtering gas of argon containing 10% nitrogen was used for deposition of the silicon nitride interlayer. Sputtering of the metals Pt and Cr was conducted using an input power of 300 W. Sputtering of the oxides and silicon nitride was conducted using an input power of 1 kW.

Barium hexaferrite was deposited by dc facing target-type sputtering using barium ferrite disk (6 cm diameter) targets having a composition Ba:Fe:O=100 g:451 g:29 g onto the interlayers described above to form barium ferrite films having a thickness of 1,000–5,000 Å using the film preparation conditions shown in Table 1.

TABLE 1

| Barium ferrite film preparation conditions | |
|---|---|
| Sputtering gas | Ar + (0–25%) $O_2$ |
| Sputtering gas pressure | 0.5 mTorr |
| Target voltage | 180 ~ 260 V |
| Discharge current | 0.12 ~ 0.5 A |
| Substrate temperature (output of a thermocouple located at substrate surface) | 500° C. ~ 550° C. |
| Deposition rate | 15 ~ 110 Å/min |
| Film thickness | 1000 ~ 5000 Å |

*thickness of the layer was about 500 Å

During platinum deposition on the carbon substrate, substantial crystallite growth of the platinum occurred during substrate heating, with the result that platinum crystallites gathered together and formed islands on the carbon substrate. As a result, the substrate surface became very rough and carbon atoms diffused to the film surface during deposition. Hexagonal barium ferrite films were not formed on platinum coated carbon substrates.

Chromium coated carbon substrates were stable up to temperatures of about 550° C. Deposition of a thin chromium film having a thickness of about 50–100 Å onto the carbon substrate increases the adhesion of the silicon nitride interlayer to the carbon substrate. Deposition of a thin chromium film onto the silicon nitride interlayer also increases the adhesion of the barium ferrite film to the silicon nitride interlayer. Hexagonal barium ferrite films deposited on chromium coated carbon substrates had a very smooth surface. X-ray diffraction analysis showed reflection peaks characteristic of the hexagonal barium ferrite phase. Increase in the substrate temperature above 550° C. produces results similar to the platinum coated carbon substrate, however, with diffusion of carbon into the magnetic recording layer.

All oxide films deposited directly on the carbon substrate had very poor adhesion and were easily removed from the carbon substrate. The barium ferrite films peeled off from the oxide-coated substrate during or after deposition. Deposited barium ferrite films on the oxide-coated carbon substrate had smooth surfaces and X-ray diffraction patterns which indicated the presence of hexagonal barium ferrite. The oxide films, therefore, were effective in preventing diffusion of carbon atoms from the substrate to the magnetic film but had insufficient adhesion.

The adhesion of silicon nitride to the carbon substrate was excellent. Additionally, silicon nitride coated substrates could be utilized at much higher temperatures than chromium deposited substrates. The barium ferrite films deposited on the silicon nitride layer had a surface which was smoother than films deposited on the chromium-coated substrate and clearly showed X-ray diffraction peaks characteristic of hexagonal barium ferrite.

Example 2

Silicon nitride films were deposited onto the carbon substrate of Example 1 using the deposition conditions shown below.

TABLE 2

| Deposition condition for $Si_3N_4$ films | |
|---|---|
| Sputtering gas | Ar + 10% $N_2$ |
| Sputtering gas pressure (mTorr) | 10 |
| Thickness (Å) | 500 |

Barium ferrite films were then deposited onto the silicon nitride interlayer by sputtering using the sputtering targets of Example 1 and the deposition conditions shown in Table 3 below.

TABLE 3

| Deposition conditions for Ba ferrite films | |
|---|---|
| Sputtering gas | Ar + 5% $O_2$ |
| Sputtering gas pressure (mTorr) | 0.5 |
| Discharge current (A) | 0.2, 0.3, 0.5 |
| Deposition rate (Å/min) | 60, 89, 150 |
| Film-thickness (Å) | 2700, 4000, 3000 |
| Substrate temperature (°C.) | 500, 550, 560, 575 |
| Substrate | $Si_3N_4$/carbon |

The crystal structure and c-axis orientation of the films were determined by X-ray diffraction (Cu Kα). The coercive force (Hc) and the saturation magnetization (Ms) of the films were measured with a vibrating sample magnetometer (VSM). A hexagonal barium ferrite film having the properties shown in Table 4 was obtained with a deposition current of about 0.5 A, partial oxygen gas pressure of about 0.025 mTorr and a substrate temperature of 550° C.

TABLE 4

| Magnetic properties of Ba ferrite film deposited on $Si_3N_4$/C substrate. | |
|---|---|
| Saturation magnetization | 280 emu/cm³ |
| Coercive force (Hc parallel) | 1180 Oe |
| Coercive force (Hc perpendicular) | 1083 Oe |
| Squareness (Sq parallel) | 0.42 |
| Squareness (Sq perpendicular) | 0.31 |
| Remnance ratio (Mr perpendicular/ Mr parallel) | 0.55 |

Obviously, numerous modifications and variations of the present invention are possible in light of the above teachings. It is therefore to be understood that within the scope of the appended claims, the invention may be practiced otherwise than as specifically described herein.

What is new and desired to be secured by Letters of Patent of the United States is:

1. A magnetic recording medium, comprising:

(a) an amorphous carbon substrate;

(b) a silicon nitride layer formed on said carbon substrate, said silicon layer having a thickness sufficient to prevent diffusion of carbon atoms from the said carbon substrate into a subsequently deposited magnetic recording layer; and (c) a continuous crystalline hexagonal barium hexaferrite magnetic recording layer deposited on said silicon nitride layer.

2. The recording medium of claim 1, wherein said silicon nitride layer has a thickness of about 200–5000 Å.

3. The recording medium of claim 2, wherein said silicon nitride layer has a thickness of about 500–2000 Å.

4. The recording medium of claim 1, wherein said barium hexaferrite layer has a thickness of about 500–5000 Å.

5. The recording medium of claim 4, wherein said barium hexaferrite layer has a thickness of about 500–3000 Å.

6. The recording medium of claim 5, wherein said barium hexaferrite layer has a thickness of about 1000–2000 Å.

* * * * *